May 19, 1964 H. R. LAWRENCE 3,133,413
CONTROL AND COOLING OF ROCKET MOTORS
Filed Sept. 12, 1960 2 Sheets-Sheet 1
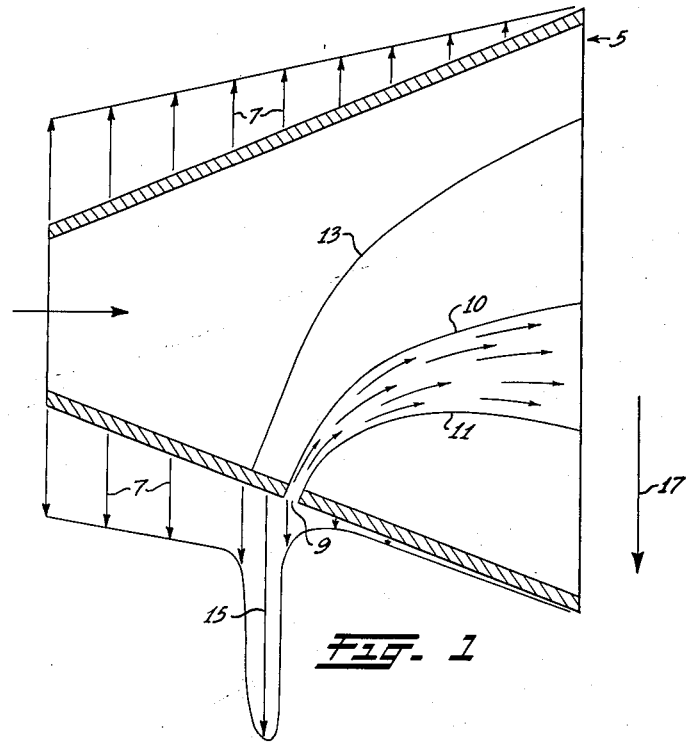
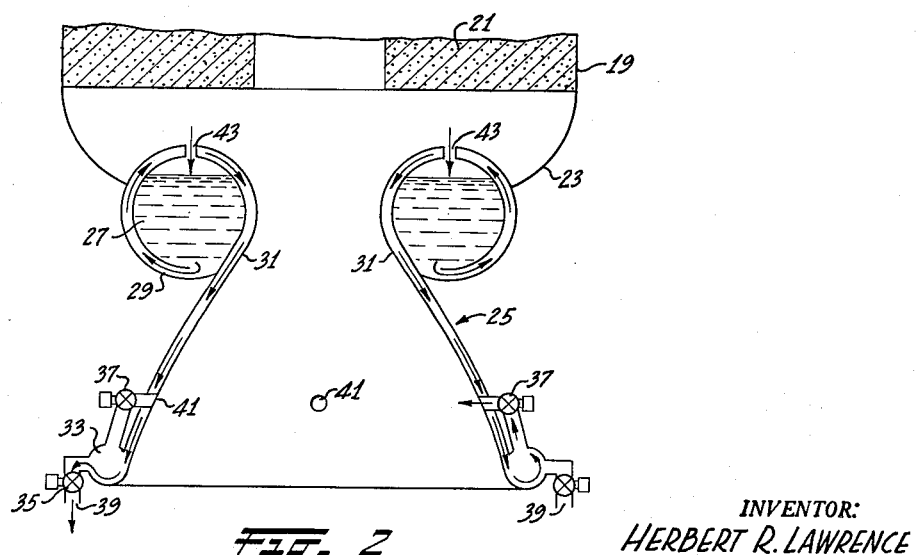
INVENTOR:
HERBERT R. LAWRENCE
BY
Eckhoff and Slick
ATTORNEYS May 19, 1964  H. R. LAWRENCE  3,133,413
CONTROL AND COOLING OF ROCKET MOTORS
Filed Sept. 12, 1960  2 Sheets-Sheet 2
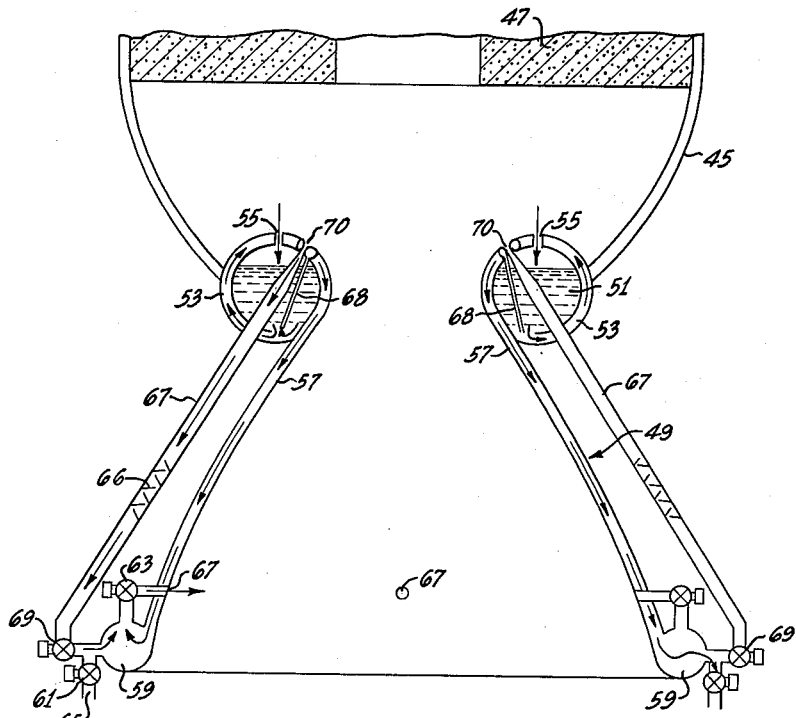
INVENTOR:
HERBERT R. LAWRENCE
BY
Eckhoff and Slick
ATTORNEYS

United States Patent Office 3,133,413
Patented May 19, 1964

3,133,413
CONTROL AND COOLING OF ROCKET MOTORS
Herbert R. Lawrence, Atherton, Calif., assignor to United Aircraft Corporation, a corporation of Delaware
Filed Sept. 12, 1960, Ser. No. 55,384
4 Claims. (Cl. 60—35.54)

This invention relates to a method of thrust-vector control combined with a method of nozzle cooling for solid propellant rocket engines.

In the past, a number of methods of steering rocket vehicles have been proposed, none of which have proved to be fully satisfactory. One method is to use aerodynamic surfaces, but this system suffers from the defect that it is only operative when the rocket is being operated within the atmosphere. Further, such systems are complicated and add a considerable weight to the rocket engine.

It has also been proposed to use a gimballed or hinged connection between portions of the rocket engine and the nozzle. However, this is ordinarily impractical in the case of solid propellant rockets since the engine includes a major portion of the vehicle structure. Although it is possible to provide a system wherein only the nozzle section of the motor is moved, such an approach causes many engineering problems, particularly in the development of gas-tight seals for movable members operating at high temperatures. The vehicle must be made longer and severe aft closure problems are encountered. Further, high actuation forces are required tending to increase the weight and complicate the control system.

Another system proposed is the use of auxiliary rockets. Since the thrust required for control in any direction may approach 10% of the main engine thrust, four such auxiliary rockets are necessary for control in any direction and add considerable weight to the rocket engine.

Means have also been proposed for introducing a mechanical device into the exit gas stream such as a jet vane, tab, spoiler or jetevator, but such systems provide difficulties in that the device, as well as the actuating mechanism is exposed to the high temperature of the exhaust gases. Further, high actuating forces are required and there is a significant loss of specific impulse.

Various systems have been proposed for the cooling of rocket nozzles. Although the vaporization of a liquid (i.e. the fuel and/or oxidizer) is frequently employed in the cooling of the nozzle and combustion zone of the liquid fueled rockets, this system has not been practical in the case of solid fueled rockets.

According to the present invention, both thrust-vector control and the cooling of the engine nozzle are accomplished in a simple but effective way utilizing the heat of the nozzle to vaporize a liquid, or to decompose a solid, and injecting the gas produced transversely into the nozzle to produce a shock wave, giving both cooling of the nozzle and thrust-vector control. This system offers a number of advantages, primarily that of greater simplicity and higher reliability over systems heretofore used. Since fixed nozzles are used the stress and installation problems associated with aft closures which contain multiple openings are avoided. Since the moving parts of the system are not exposed to the flow of hot gases, there is a higher degree of reliability than systems heretofore used have afforded. Similarly, the power and actuator systems can be made smaller because of the simplicity of the system. The nozzle design is more dependable than nozzles heretofore used since the nozzle is cooled and one can thus avoid the use of high temperature materials in the nozzle. The system of the present invention does not require any hot gas seals. There is little loss in the system because additional thrust is obtained from the fluid either when injected into the nozzle or aft.

In the drawings forming part of this application:
FIGURE 1 is a diagrammatic view of a rocket engine nozzle showing the forces which are produced within the nozzle when a fluid is injected in one side thereof.
FIGURE 2 is a sectional view of a rocket engine embodying the present invention.
FIGURE 3 is a sectional view of a rocket nozzle, similar to FIGURE 2, wherein provision is made for greater control by bleeding gas from the combustion chamber.

Referring now to FIGURE 1, a theoretical rocket nozzle generally designated 5 is shown wherein a series of arrows 7 are shown to illustrate nozzle wall side forces, the relative amount of force being indicated by the relative lengths of the arrows. In one side of the nozzle, as at 9, provision has been made for injecting a fluid into the stream of hot gas. This fluid takes the path shown by the space between the lines 10 and 11 and this sets up a shock wave having a profile 13. The shock wave 13 produces a large amount of force on one side of the nozzle wall as is shown by the arrow 15. Thus, a resultant side force 17 is produced by the injection of the fluid axially into the stream of hot exit gases. This side component is much greater than would be produced by the discharge of the same volume of fluid external of the nozzle. This augmentation is due to interaction between the main stream and jet flows.

In FIGURE 2 there is shown in cross-sectional view the aft end of a rocket engine embodying the present invention. Here a rocket engine 19 is filled with a propellant grain 21. The rocket engine has an aft closure 23 and a nozzle assembly, generally designated 25. The nozzle assembly embodies a toroidal reservoir 27, which also forms the convergent section of the rocket nozzle. The reservoir 27 is filled with a suitable material such as water incorporating a freezing point depressant such as methanol. Leading from the tank 27 is an outlet 29 which surrounds the tank, forming the nozzle throat and walls as at 31. The passage 29 leads to a stream manifold 33 to which are attached valves 35 and 37. The valves 35 lead to outlet ducts 39 while the valves 37 lead to the secondary injection ports 41. An opening 43 is provided leading from the combustion zone of the rocket motor to the reservoir 27. Preferably, there are four valves 35 and 37, outlets 39 and ports 41. However, three of each might be used, or a number greater than four could be employed. In any event, they are spaced equally around the nozzle.

When the rocket motor is ignited, pressure through the opening 43 into the reservoir 27 forces fluid therefrom into the space 29. As the fluid passes through this passage it is vaporized and builds up a substantial pressure and the latent heat of vaporization of the liquid serves to cool the rocket nozzle. As the vapor comes to the manifold 33 it can be discharged either through the ports 39 or 41 depending on whether or not vector control is needed. In other words, vapor generation is carried out at a rate determined by the cooling requirements and if no vector control is needed the vapor is merely discharged through the ports 39 adding to the thrust of the rocket motor. On the other hand, should control be necessary all or a portion of the fluid is injected through one or more of the ports 41 exerting vector control as has been outlined above. Under some conditions, vaporization may not take place or may be incomplete. However, liquid or a mixture of liquid and gas can be injected through the ports 41 and will give effective vector control.

It is frequently necessary to provide for more fluid injection than that required for nozzle cooling. This is particularly true when the engine is just starting but may also be true for certain peak steering requirements. Under such circumstances, the system shown in FIGURE 3 may be used. Here a rocket engine 45 has a propellant grain 47 therein and a nozzle generally designated 49. A toroidal reservoir 51 is provided having a fluid passage 53 leading therefrom as well as an opening 55 for the purpose of pressurizing the liquid in the tank 51. A passage 53 extends, as described previously, to the rear of the rocket, forming the nozzle throat and walls as at 57. The passage 53 leads to the stream manifold 59 which leads to the valves 61 and 63, which in turn lead to the passages 65 and 67, respectively. Up to this point the operation of the system is exactly as has been described above. However, here auxiliary lines 67 are provided leading from the combustion zone to the valves 69, which in turn lead to the manifold 59. The lines 67 may contain baffles 66 to retain any particles which may be present in the combustion gas. Many propellants, particularly those containing metallic aluminum, contain solid combustion products and it is sometimes desirable to trap these particles since they may interfere with the operation of the valves. Further, such particles are relatively ineffective for exercising thrust-vector control because of their high inertia. Tubes 68 lead from the tank 51 to the venturi 70 which serve to draw liquid into the lines 67, cooling the gases therein. By opening the valves 69, gas can be bled directly from the combustion chamber of the rocket engine to exert vector-control through the openings 67.

The material filling the tank can be a liquid such as water which may or may not contain a freezing point depressant, anhydrous liquid ammonia or a mixture of ammonia and water such as aqua ammonia. Such liquids have a high latent heat and produce a large volume of vapor and are thus ideally suited both for use as coolants and as a vector control means. Ammonia is particularly advantageous since it dissociates at the temperatures encountered in rocket nozzles, reducing its average molecular weight to approximately 9, essentially doubling its effectiveness as a shock producer. However, instead of using a liquid which merely vaporizes, it is also possible to use a material which decomposes under the conditions produced in the rocket engine, such as lithium hydride or lithium borohydride. Such materials decompose, releasing a large volume of hydrogen gas which serves for vector control. Further, since the decomposition of such materials is endothermic, a cooling effect is produced at the nozzle area. Obviously, it is necessary to employ a control and actuation system for the various valves, but such system forms no part of the present invention and is not herein described.

It will be noted that both systems outlined place considerable pressure on the liquid in the reservoir. Thus, under starting conditions when there has been insufficient heat transfer to start the boiling of the water, nevertheless liquid water will be injected into the nozzles and thus control can be exercised even before boiling has started. With ammonia or mixtures of ammonia and water, the time delay before boiling commences is negligible.

I claim:

1. In a solid propellant rocket engine having a combustion zone, the improvement comprising a system of nozzle cooling annd thrust vector control comprising a toroidal tank forming the throat of the engine, said toroidal tank having a passage leading from the aft end of said tank around the outside of the tank, said passage being divergent toward the aft end of said rocket engine to form the nozzle for the said rocket engine, said passage terminating in a manifold near the aft end of the nozzle; and valve means whereby material passing from said tank through said passage to said manifold can be selectively discharged either aft of the nozzle engine or transversely into the nozzle.

2. The structure of claim 1 wherein said tank is filled with a liquid.

3. The device of claim 1 wherein a direct passage is provided from the combustion zone of the rocket engine to the manifold said passage being provided with a venturi tube whereby a liquid can be drawn from said tank through said tube.

4. The device of claim 3 wherein said direct passage is provided with baffles for the entrapment of solid materials.

References Cited in the file of this patent

UNITED STATES PATENTS

| 2,875,578 | Kadosch et al. | Mar. 3, 1959 |
| 2,892,308 | Ferri et al. | June 30, 1959 |
| 2,914,916 | Gelin et al. | Dec. 1, 1959 |
| 2,916,873 | Walker | Dec. 15, 1959 |
| 2,943,821 | Wetherbee | July 5, 1960 |
| 3,036,430 | Eggers et al. | May 29, 1962 |

FOREIGN PATENTS

| 1,197,701 | France | June 8, 1959 |